United States Patent
Tiitinen et al.

(10) Patent No.: US 12,494,727 B2
(45) Date of Patent: Dec. 9, 2025

(54) STABLE AND PASSIVE OBSERVER-BASED V/HZ CONTROL FOR SYNCHRONOUS MOTORS

(71) Applicant: ABB Schweiz AG, Baden (CH)

(72) Inventors: Lauri Tiitinen, Espoo (FI); Marko Hinkkanen, Espoo (FI)

(73) Assignee: ABB Schweiz AG, Baden (CH)

( * ) Notice: Subject to any disclaimer, the term of this patent is extended or adjusted under 35 U.S.C. 154(b) by 146 days.

(21) Appl. No.: 18/476,461

(22) Filed: Sep. 28, 2023

(65) Prior Publication Data

US 2024/0128906 A1    Apr. 18, 2024

(30) Foreign Application Priority Data

Oct. 5, 2022  (EP) .................. 22199847

(51) Int. Cl.
*H02P 21/13*  (2006.01)
*H02P 21/22*  (2016.01)

(52) U.S. Cl.
CPC .............. *H02P 21/13* (2013.01); *H02P 21/22* (2016.02); *H02P 2207/055* (2013.01)

(58) Field of Classification Search
CPC .... H02P 21/13; H02P 21/22; H02P 2207/055; H02P 2207/01; H02P 21/141
(Continued)

(56) References Cited

U.S. PATENT DOCUMENTS

| | | | |
|---|---|---|---|
| 9,331,618 B2 * | 5/2016 | Sonoda | H02P 21/32 |
| 11,239,772 B1 * | 2/2022 | Bojoi | H02P 21/22 |
| 11,444,558 B1 * | 9/2022 | Latham | H02P 21/141 |

FOREIGN PATENT DOCUMENTS

| | | |
|---|---|---|
| CN | 114337416 A | 4/2022 |
| JP | 5589556 B2 | 9/2014 |
| JP | 2018121394 A | 8/2018 |

OTHER PUBLICATIONS

Hinkkanen Marko et. al; Observers for Sensorless Synchronous Motor Drives: Framework for Design and Analysis; IEEE Transactions on Industry Applications, IEEE Service Center, Piscataway, NJ; vol. 54, No. 6; Nov. 1, 2018; 11 Pages.

(Continued)

*Primary Examiner* — David Luo
(74) *Attorney, Agent, or Firm* — Whitmyer IP Group LLC

(57) ABSTRACT

According to an aspect, there is provided an apparatus for a drive for driving a synchronous motor. The apparatus includes means for performing the following. The apparatus obtains a stator current vector and estimates, using a state observer, a stator flux linkage vector based on the stator current vector, a voltage reference vector, a stator angular frequency reference and a control-rotor rotation angle estimated by the state observer and being defined as an angle between control and rotor coordinates. The state observer is a speed-sensorless back-electromotive-force-based state observer defined in the control coordinates and based on a mathematical model for the synchronous motor. The apparatus performs speed-sensorless state-feedback control based on the estimated stator flux linkage vector, the stator current vector, a stator flux linkage reference vector and the stator angular frequency reference for calculating the stator voltage reference vector. Finally, the apparatus applies the stator voltage reference vector to an inverter of the drive.

15 Claims, 5 Drawing Sheets

(58) Field of Classification Search
CPC ........ H02P 6/182; H02P 25/026; H02P 27/04; H02P 2207/05
USPC .............................. 318/400.02, 400.01, 700
See application file for complete search history.

(56) References Cited

OTHER PUBLICATIONS

Belkhier Youcef et al; Passivity-Based Voltage Control Design of Grid Connected Wind Turbine With PMSG; 2020 IEEE Andescon, IEEE; Oct. 13, 2020; 5 Pages.
Yang Ge et al; Sensorless control of PMSM using generalized extended state observer and adaptive resistance estimation; IET Electric Power Applications, IET, UK, vol. 14, No. 11, Aug. 10, 2020; 12 Pages.
Beddiaf Y; Database Compendex [Online] Engineering Information, Inc., New York, NY; Modified speed sensorless indirect field-oriented control of induction motor drive; Database accession No. E20162902594454; 2 Pages.
European Search Report; Application No. EP22199847; Completed: Feb. 24, 2023; 4 Pages.

* cited by examiner

STABLE AND PASSIVE OBSERVER-BASED V/HZ CONTROL FOR SYNCHRONOUS MOTORS

TECHNICAL FIELD

Various example embodiments relate to control of industrial processes.

BACKGROUND

Volts-per-hertz (V/Hz) control is a commonly used variable frequency drive control scheme where the ratio between voltage and frequency fed to the motor is kept constant so as to keep torque production stable. For control of synchronized motors, V/Hz control remains a popular alternative to the well-known field-oriented control. However, open-loop V/Hz control methods for control of synchronous motors are inherently unstable, unless the motor is equipped with additional damper windings. Therefore, V/Hz control methods for synchronous motors typically include one or two compensation loops to increase the stable operating region by altering the stator voltage reference or the frequency reference. These compensators are typically based on measured stator current or estimated input power or, in some cases, on rotor speed and the DC-link current. Additional outer control loops may need to be provided to improve the efficiency of the control strategy. Due to the heuristic nature of these compensators, the overall system is difficult to analyze. Consequently, tuning of the control is almost exclusively based on trial-and-error methods and the complete stability cannot be guaranteed. Furthermore, known V/Hz control methods lack generality, i.e., they focus on only one synchronous motor type and may not be directly applicable to others.

SUMMARY

According to an aspect, there is provided the subject matter of the independent claims. Embodiments are defined in the dependent claims.

One or more examples of implementations are set forth in more detail in the accompanying drawings and the description below. Other features will be apparent from the description and drawings, and from the claims.

Some embodiments provide an apparatus, a method, and computer program for control of a synchronous motor.

BRIEF DESCRIPTION OF DRAWINGS

In the following, example embodiments will be described in greater detail with reference to the attached drawings, in which.

DETAILED DESCRIPTION

Figure 1:
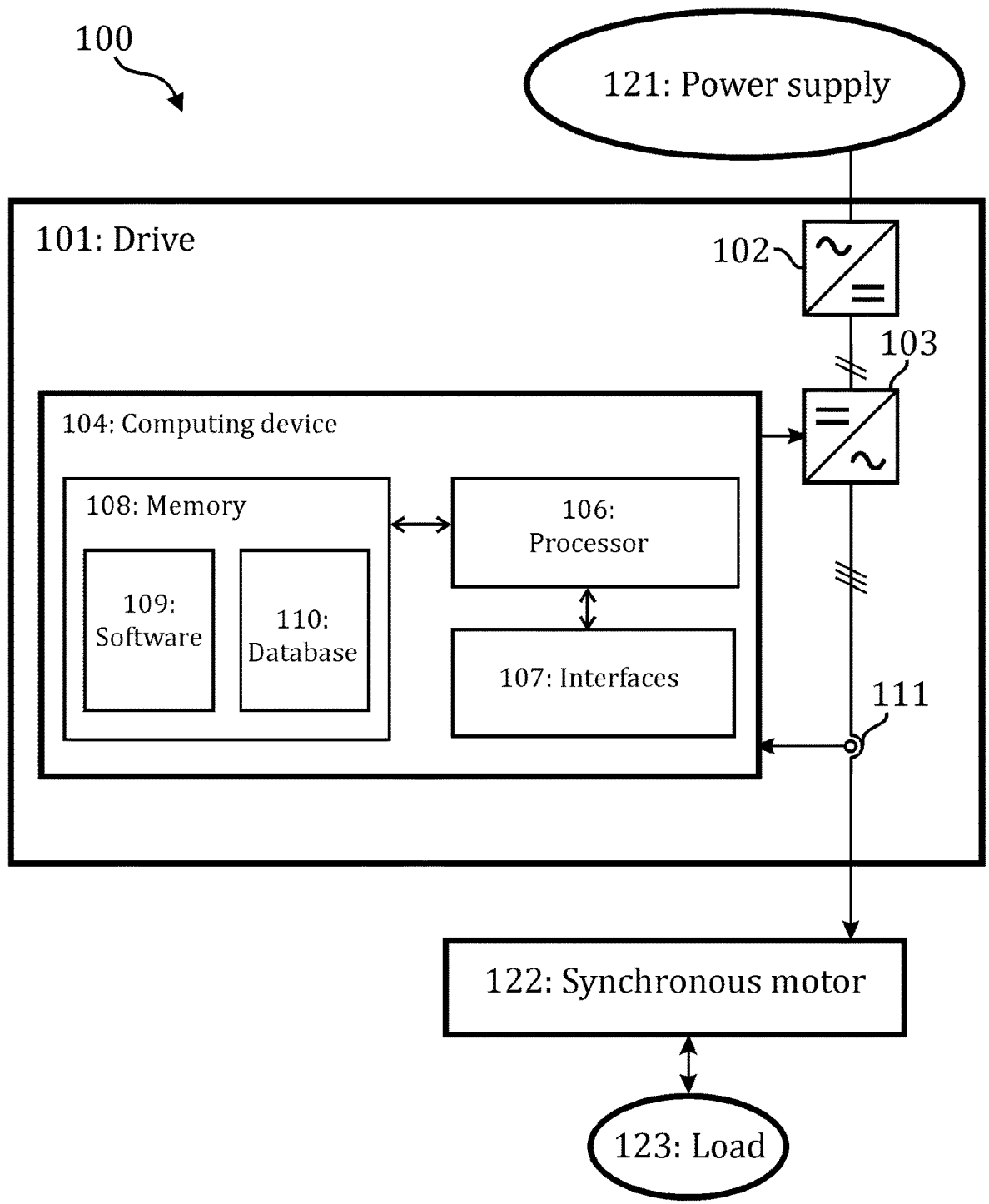
FIG. 1 illustrates an exemplary industrial system according to an embodiment.

The following embodiments are only presented as examples. Although the specification may refer to "an", "one", or "some" embodiment(s) and/or example(s) in several locations of the text, this does not necessarily mean that each reference is made to the same embodiment(s) or example(s), or that a particular feature only applies to a single embodiment and/or example. Single features of different embodiments and/or examples may also be combined to provide other embodiments and/or examples.

In the following, the following mathematical conventions are employed. Vectors are denoted by boldface italicized lowercase letters and matrices by boldface non-italicized uppercase letters (or, in some cases, by boldface numerical characters). The matrix transpose will be marked with the superscript T. The superscript s is used for indicating that the quantities are given in stator coordinates (equally called $\alpha\beta$-coordinates) while no superscript is used for quantities given in control coordinates (equally called xy-coordinates or synchronous coordinates). Estimated quantities (i.e., quantities which have been estimated, e.g., using a flux observer, as opposed to being directly measured or being pre-defined) are denoted with a hat operator ^. The symbol j is used for denoting the imaginary number. The vectors described below are, unless otherwise explicitly stated, column vectors (having two elements). The matrices described below are, unless otherwise explicitly stated, 2×2 matrices. The identity matrix I, the orthogonal rotation matrix J and the zero matrix 0 are defined, respectively, as $$I = \begin{bmatrix} 1 & 0 \\ 0 & 1 \end{bmatrix}, \tag{1}$$

$$J = \begin{bmatrix} 0 & -1 \\ 1 & 0 \end{bmatrix} \text{ and} \tag{2}$$

$$0 = \begin{bmatrix} 0 & 0 \\ 0 & 0 \end{bmatrix}. \tag{3}$$

In at least some of the following embodiments, a per-unit (pu or p.u.) system may be employed for mathematical description of a synchronous motor. The per-unit system is the dimensionless relative value system defined in terms of base values. A pu quantity $x_{pu}$ may be defined as an absolute physical value $x_{act}$ in SI-units divided by its base value $x_B$, that is, the equation $x_{pu}=x_{act}/x_B$ may apply.

As used in this application, the term 'circuitry' may refer to one or more or all of the following: (a) hardware-only circuit implementations, such as implementations in only analog and/or digital circuitry, and (b) combinations of hardware circuits and software (and/or firmware), such as (as applicable): (i) a combination of analog and/or digital hardware circuit(s) with software/firmware and (ii) any portions of hardware processor(s) with software, including digital signal processor(s), software, and memory(ies) that work together to cause an apparatus, such as a terminal device or an access node, to perform various functions, and (c) hardware circuit(s) and processor(s), such as a microprocessor(s) or a portion of a microprocessor(s), that requires software (e.g. firmware) for operation, but the software may not be present when it is not needed for operation. This definition of 'circuitry' applies to all uses of this term in this application, including any claims. As a further example, as used in this application, the term 'circuitry' also covers an implementation of merely a hardware circuit or processor (or multiple processors) or a portion of a hardware circuit or processor and its (or their) accompanying software and/or firmware.

The embodiments to be discussed below in detail seek to overcome at least some of the problems or limitations of the existing V/Hz control methods for controlling synchronous motors by providing a general purpose control method for controlling a synchronous motor of any type. The proposed control method incorporates a simple state-feedback control law and a state observer, which together replace the heuristic compensators in conventional V/Hz control methods. As a result, the trial-and-error based tuning is avoided of the earlier control methods, and a deterministic and physics-based tuning process can be adopted. Consequently, the entire feasible operating range can be made passive and stable. Moreover, the control method retains the well-known advantage of V/Hz control in the field-weakening region, where the full inverter voltage can be exploited with no risk of loss of control.

FIG. 1 illustrates a system 100 to which embodiments may be applied. FIG. 1 illustrates simplified system architecture only showing some elements and functional entities (namely, showing only some excitation control related elements and functional entities), all being logical units whose implementation may differ from what is shown. The connections shown in FIG. 1 are logical connections; the actual physical connections may be different. It is apparent to a person skilled in the art that the system may also comprise other functions and structures.

FIG. 1 illustrates a system 100 comprising a drive 101 (equally called a motor drive) controlling a synchronous motor 122. The drive 101 is powered by a power supply 121. The illustrated system 100 (or specifically the drive 101) is configured to operate using an observer-based V/Hz control method to be described below in detail.

According to a general definition, the synchronous motor 122 is an electric motor where the rotation of the motor shaft (i.e., of the rotor) is synchronized with the frequency of the supply current at steady state so that the rotation period is equal to an integral number of alternating current (AC) cycles.

The synchronous motor 122 may be any type of synchronous motor. For example, the synchronous motor 122 may be a (surface-mounted) permanent-magnet (PM) motor, a synchronous reluctance motor (SyRM) or an externally excited synchronous motor. In the case of an externally excited synchronous motor, the external excitation may be provided by an exciter (not shown in FIG. 1) which is controlled or driven by the drive 101. The exciter may be, e.g., a slip ring with conductive brushes or a brushless exciter. In general, the synchronous motor 122 may be a salient pole motor or a non-salient pole motor (such as the surface-mounted PM motor).

The synchronous motor 122 is connected to a mechanical load 123. The mechanical load 123 may correspond, for example, to a device or a system for transporting material, such as a pump, a fan, a compressor, a blower, a conveyor belt, a crane and/or an elevator and/or a device or a system for processing materials, such as a paper machine, a mill, a stirrer and/or a centrifuge.

The drive 101 is a device used for controlling (or configured to control) the motion of the synchronous motor 122. Said control may be achieved by changing (either directly or indirectly due to a change in one or more related parameters) one or more drive parameters of the drive 101 which may comprise parameters such as torque, speed, power, voltage, excitation current, stator current, stator flux, stator flux linkage, frequency, motor control mode (e.g., scalar, vector or direct torque control), proportional-integral-derivative (PID) controller settings, acceleration ramp settings, deceleration ramp settings and/or other parameters affecting the operation of the drive. The drive 101 may specifically be an electrical drive (an AC drive supporting low to high voltages and/or low to high motor speeds). The drive 101 may be equally called a frequency converter. The drive 101 may be a programmable logic controller (PLC) or a (motor) soft starter. In an embodiment, the drive 101 may be a variable speed drive (VSD) or a variable frequency drive (VFD). The drive 101 (or specifically the inverter unit 103) feeds the synchronous motor 122 via a three-phase power supply. Contrary to some definitions of term "drive", the synchronous motor 122 which is driven by the drive 101 does not form a part of the drive 101 itself in the context of this application (as is also shown in FIG. 1).

The drive 101 comprises a rectifier unit 102 for connecting to the alternating current (AC) power supply 121. The rectifier unit 102 is configured to convert the AC power received from the power supply 121 to DC power.

Moreover, the drive 101 comprises an inverter unit 103 which is configured to convert the DC power provided by the inverter unit 103 to AC power for driving the synchronous motor 121 in a controlled manner. Specifically, the inverter unit 103 is configured to feed the stator winding of the synchronous motor 122 to control the operation of the synchronous motor 122 (e.g., the air gap torque and the stator flux). In other words, the inverter unit 103 is configured to provide stator voltage signals having a particular voltage and frequency to the synchronous motor 121. The inverter unit 103 may be or comprise a pulse width modulation (PWM) inverter. The inverter unit 103 may take as an input at least a voltage reference vector comprising α- and β-components of the voltage reference.

The rectifier and inverter units 102, 103 may be connected together via a direct current (DC) circuit (equally called a DC link) comprising at least one DC choke (not shown in FIG. 1).

The rectifier and inverter units 102, 103 effectively form together a DC link converter (unit) for performing a two-phase frequency conversion from the AC power of the AC power supply 121 to DC power and from said DC power to AC power suitable for driving the synchronous motor 122 in a controlled manner via DC. In other embodiments, a single-phase frequency conversion may be employed in the drive 101, instead of the two-phase frequency conversion. In such embodiments, a (single) direct converter unit may be provided instead of the rectifier and inverter units 102, 103 (and possibly the DC link between them).

The drive 101 comprises a current detector 111 for detecting the AC current fed to the synchronous motor 122 and providing it to the computing device 104 (possibly via one or more further elements not shown in FIG. 1). The detected current is usable by the computing device 104 for control of the synchronous motor 122.

To enable control of the synchronous motor 122 by the drive 101, the drive 101 comprises a computing device 104 (or, in general, one or more computing devices). The computing device 104 may be specifically configured at least to implement the observer-based V/Hz control according to embodiments (to be discussed below in detail). Namely, the computing device may be configured to apply observer-based V/Hz control to the synchronous motor 122 at least based on a stator flux linkage reference and a stator angular frequency reference (i.e., the desired values of the stator flux linkage and the stator angular frequency). The stator flux linkage reference and/or a stator angular frequency reference may be settable by the user. Alternatively, the stator flux linkage reference may be calculated based on nameplate values (e.g., rated voltage and frequency). The computing device 104 is electrically connected (via its interfaces 107) at least to the inverter 103 and to the current detector 111.

In some alternative embodiments, the computing device 104 may form a part of a converter (or a converter unit) of the drive 101 such as the rectifier 102 or the inverter 103.

The computing device 104 comprises a processor 106, interfaces 107 and a memory 108. The memory 108 comprises at least one database 110 and software 109 (i.e., one or more algorithms). The processor 104 may be a central processing unit (CPU) of the drive 101. In some embodiments, one or more control circuitry such as one or more processors may be provided in the computing device 104, instead of a single processor 106.

Figure 2:
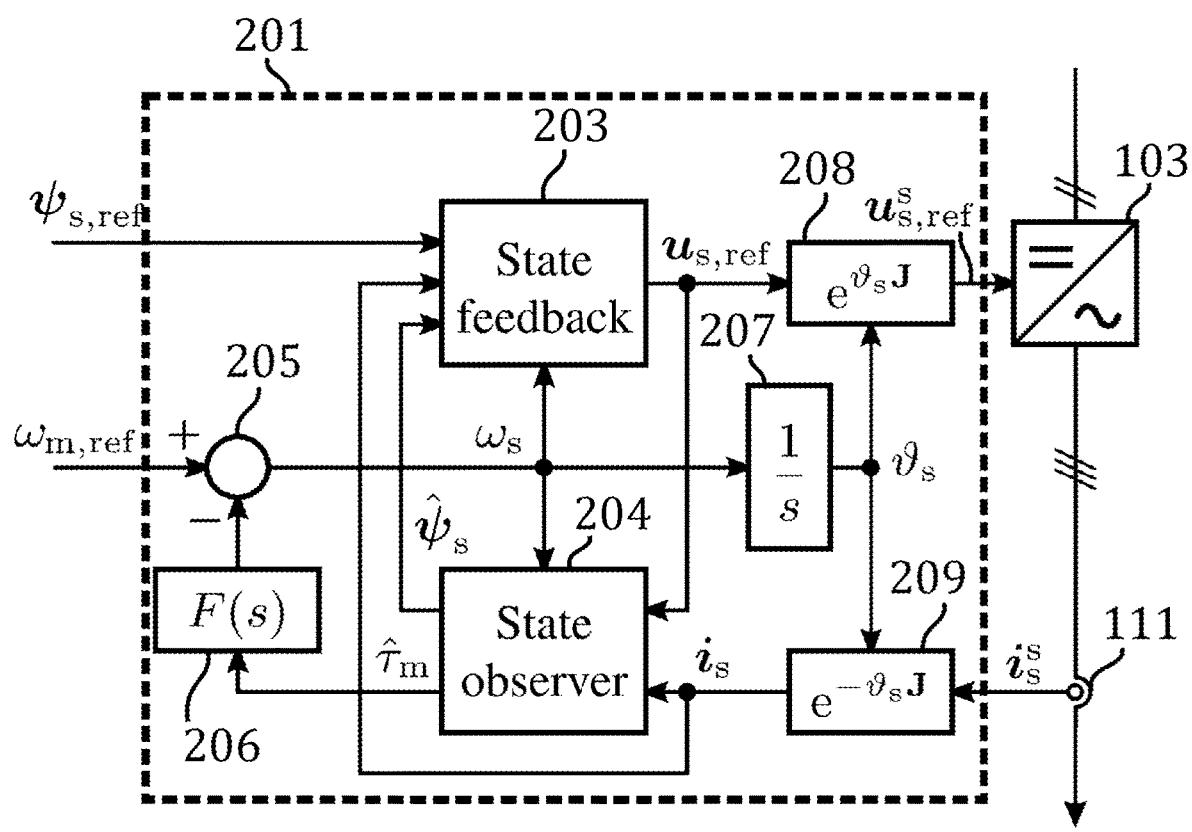
FIG. 2 shows a schematic view of elements for implementing observer-based V/Hz control.

According to some embodiments, the computing device 104 may comprise one or more control circuitry, such as at least one processor 106, and at least one memory 108, including one or more algorithms, such as a computer program code (software) 109, wherein the at least one memory 108 and the computer program code (software) 109 are configured, with the at least one processor 106, to cause the computing device 101 to carry out any one of the exemplified functionalities of the computing device or the drive to be described below (in connection with FIGS. 2 and/or 3). It is also feasible to use specific integrated circuits, such as ASIC (Application Specific Integrated Circuit), a field-programmable gate array (FPGA) or other components and devices for implementing the functionalities in accordance with different embodiments.

The memory 108 of the computing device 104 may be implemented using any suitable data storage technology, such as semiconductor based memory devices, flash memory, magnetic memory devices and systems, optical memory devices and systems, fixed memory and removable memory.

The interfaces 107 of the computing device 104 may comprise, for example, one or more communication interfaces comprising hardware and/or software for realizing communication connectivity according to one or more communication protocols. Specifically, the one or more communication interfaces 107 may comprise, for example, at least one interface providing a connection to the inverter 103. The one or more communication interfaces 104 may comprise standard well-known components such as an amplifier, filter, frequency-converter, (de)modulator, and encoder/decoder circuitries, controlled by the corresponding controlling units, and one or more antennas. The one or more communication interfaces 107 may also comprise a user interface.

The drive 101 may further comprise one or more user input devices (e.g., a control panel or a touch screen) for enabling the user to control the operation of the drive 101 (via the computing device 104) and/or a display (not shown in FIG. 1). The one or more user input devices may be specifically electrically connected to the computing device 104).

While FIG. 1 illustrates a single synchronous motor 122, in other embodiments the drive 101 may be used for controlling an electrical machine comprising multiple synchronous motors.

As was described above, the drive (or a computing device thereof) according to embodiments is configured to implement an observer-based V/Hz control method for control of synchronous motors. FIG. 2 shows a schematic view of elements for implementing said observer-based V/Hz control. Specifically, FIG. 2 illustrates a set of logical elements 201 which may be implemented using a computing device 104 of the drive 101 of FIG. 1 and their connections to the inverter 103 and the current detector 111 of the drive 101 of FIG. 1.

Similar to as described in connection with FIG. 1, the observer-based V/Hz control takes, as reference inputs defining targeted values, an (external) stator flux linkage reference $\psi_{s,ref}$ and an (external) rotor angular speed reference $\omega_{m,ref}$ as shown on the left side of FIG. 2. The stator flux linkage reference $\psi_{s,ref}$ and the rotor angular speed reference $\omega_{m,ref}$ (or at least the rotor angular speed reference $\omega_{m,ref}$) may be definable by a user of the drive.

The core elements for implementing the observer-based V/Hz control are a state observer element 204 and a state feedback control element 203 implementing state-feedback control (or a particular state-feedback control law) based on feedback received from the state observer element 204 (among other inputs). The state observer element 204 is specifically a state observer defined for a stator flux linkage vector of the synchronous motor (or flux observer or flux state observer for the synchronous motor in short). In other words, the stator flux linkage vector is the state vector of the state observer 204. The state feedback control element 203 and the state observer element 204 may be implemented in control coordinates. The control coordinates are coordinates which rotate at a rate defined by the (external) rotor angular speed reference $\omega_{m,ref}$ and by the high-pass filtered torque estimate $F(s)\hat{\tau}_m$ providing damping (though the damping functionality and thus also the $F(s)\hat{\tau}_m$ dependence may be omitted in some embodiments). In other words, the control coordinates are aligned with the rotor angular speed reference $\omega_{m,ref}$ which may be given by the user (possibly taking also into account damping). The control coordinates may be equally called synchronous coordinates.

Both elements 203, 204 may be configured to be inherently (speed) sensorless, that is, they may be configured so as not to require (sensor-based) measurements of the rotor (angular) speed to operate, as will be described below in detail. The elements 203, 204 enable together stabilization and passivation of the drive in its whole feasible operating range.

In the following, the operation of the state observer element 204 and the state feedback control element 203 is described, first, in general followed by a detailed description of specific implementations of the elements 203, 204.

The synchronous motor is modelled in controller coordinates (i.e., xy-coordinates or synchronous coordinates), whose angular position is $\vartheta_s$ and angular speed is $\omega_s = d\vartheta_s/dt$, both with respect to the stator (or stator coordinates). In other words, $\vartheta_s$ is an angle between control coordinates and the stator coordinates or more specifically between the x-axis of the control coordinates and the α-axis of the stator coordinates. Rotor coordinates (i.e., dq-coordinates with direct, d, and quadrature, q, axes) are fixed to the rotor, whose angular position and speed are $\vartheta_m$ and $\omega_m = d\vartheta_m/dt$, respectively. The stator current vector defining x- and y-components ($i_{sx}$ & $i_{sy}$) of the stator current is denoted in the following as $i_s$ and is defined according to $i_s=[i_{sx}\ i_{sy}]^T$. Other vector quantities are represented in a similar manner.

The purpose of the state observer element 204 is to observe the state of the synchronous motor based on the AC currents fed to the synchronous motor. As described above, the current detector 111 is used detect the AC currents fed to the synchronous motor. Specifically, the current detector 111 detects a stator current vector defining α- and β-components of the current. The $e^{-\vartheta_s J}$ multiplication element 209 applied to the detected stator current vector $i_s^s=[i_{s\alpha}^s\ i_{s\beta}^s]^T$ ($i_{s\alpha}^s$ and $i_{s\beta}^s$ being α- and β-components of the detected stator current) serves to perform conversion from the stator coordinates (i.e., α- and β-coordinates) to the control coordinates (i.e., the x- and y-coordinates) used by the state observer element 204.

In addition to the stator current vector $i_s$, the state observer element 204 takes as inputs the stator voltage reference vector $u_{s,ref}$ obtained from the state feedback control element 203 and the stator angular frequency $\omega_s$ (defined at least based on the external rotor angular speed reference $\omega_{m,ref}$). Similar to the stator current vector $i_s$, the stator voltage reference vector $u_{s,ref}$ also comprises x- and y-components ($u_{sx,ref}$ & $u_{sy,ref}$), that is, it is defined as $u_{s,ref}=[u_{sx,ref}\ u_{sy,ref}]^T$.

In some embodiments, the damping of the mechanical system may be increased using additional feedback in the form of an electromagnetic torque estimate $\hat{\tau}_m$ derived by the state observer element 204 which is applied to a (passive) high-pass filter F(s) 206, as will be described in detail below. In other embodiments, no such additional feedback may be implemented (i.e., elements 205 and/or 206 may be omitted).

The purpose of the state feedback control element 203 is to calculate a stator voltage reference vector $u_{s,ref}=[u_{sx,ref}\ u_{sy,ref}]^T$ based on feedback received from the state observer element 204 and on the stator flux linkage reference $\psi_{s,ref}$ and the rotor angular speed reference $\omega_{m,ref}$ (optionally, adjusted in element 205 for improving damping). The stator voltage reference vector $u_{s,ref}$ is subsequently provided to the inverter 103 via the $e^{\vartheta_s J}$ multiplication element 208. The $e^{\vartheta_s J}$ multiplication element 208 serves to convert the voltage reference vector $u_{s,ref}$ from the control coordinates (i.e., the x- and y-coordinates) to the stator coordinates (i.e., α- and β-coordinates). The angle $\vartheta_s$ is calculated based on the stator angular frequency $\omega_s$ by applying the 1/s multiplication element 207 (corresponding to integration in the time domain), where s is a time differential operation, i.e., s=d/dt. The stator angular frequency $\omega_s$ is evaluated based on at least the rotor angular speed reference $\omega_{m,ref}$ (and optionally on high-pass-filtered estimated torque $F(s)\hat{\tau}_m$).

In some embodiments, the stator angular frequency $\omega_s$ may be equal to the rotor angular speed reference $\omega_{m,ref}$.

To carry out the calculation of the voltage reference vector $u_{s,ref}$ the state feedback control element 203 takes, as inputs (i.e., feedback), values of a stator flux linkage reference vector $\psi_{s,ref}$, a detected stator current vector $i_s$ and a stator angular frequency $\omega_s$. Similar to as described above for other vector quantities, the stator flux linkage reference vector $\psi_{s,ref}$ comprises x- and y-components ($\psi_{sx,ref}$ & $\psi_{sy,ref}$) of the stator flux linkage reference, that is, it is defined as $\psi_{s,ref}=[\psi_{sx,ref}\ \psi_{sy,ref}]^T$. The stator angular frequency $\omega_s$ may correspond here to the rotor angular speed reference $\omega_{m,ref}$ or may be calculated based thereon.

In some embodiments, the stator flux linkage reference vector $\psi_{s,ref}$ may be defined more simply as $\psi_{s,ref}=[\psi_{s,ref}\ 0]^T$, where $\psi_{s,ref}$ is a stator flux linkage reference. In other words, we may have $\psi_{sx,ref}=\psi_{s,ref}$ and $\psi_{sy,ref}=0$.

The state observer element 204 may be based on a mathematical model of the synchronous motor. To facilitate more detailed discussion of the implementation of the state observer element 204, an example of such a mathematical model of the synchronous motor is discussed in the following.

A stator inductance matrix $L_s$ for the synchronous motor may be defined as $$L_s(\delta) = e^{-\delta J}\begin{bmatrix} L_d & 0 \\ 0 & L_q \end{bmatrix}e^{\delta J}, \quad (4)$$

where $\delta = \vartheta_s - \vartheta_m$ is an angle of the control coordinate system with respect to the rotor coordinate system (or specifically to its d-axis) and $L_d$ and $L_q$ are d- and q-axis inductances of the synchronous motor. The angle $\delta$ is called in the following control-rotor rotation angle. Based on (4), applying the stator inductance matrix to a stator current vector provided in control coordinates corresponds to, first, rotating the stator current vector so that it is given in rotor coordinates (operation $e^{\delta J}$), second, multiplying a d-component of the stator current vector with $L_d$ and q-component of the stator current vector with $L_q$ and, third, rotating the resulting current vector back to control coordinates (operation $e^{-\delta J}$).

Moreover, a PM flux linkage vector $\psi_f$ for the synchronous motor may be defined as $$\psi_f(\delta) = e^{-\delta J}\begin{bmatrix} \psi_f \\ 0 \end{bmatrix}. \quad (5)$$

where $\psi_f$ is a PM flux linkage. Notably, if the control coordinate system is fixed to the stator flux linkage, the control-rotor rotation angle $\delta$ corresponds to the load angle.

The stator flux linkage vector $\psi_s$ and the control-rotor rotation angle $\delta$ may be selected as the state variables for the mathematical model of the synchronous motor. With this selection, nonlinear state equations describing the electrodynamics of the synchronous motor in control coordinates may be written as $$\frac{d\psi_s}{dt} = u_s - R_s i_s - \omega_s J \psi_s, \quad (6)$$

$$\frac{d\delta}{dt} = \omega_s - \omega_m, \quad (7)$$

where $u_s$ is the stator voltage vector, $R_s$ is the stator resistance of the synchronous motor, $\psi_s$ is a stator angular speed or frequency (e.g., the angular speed of the control coordinates relative to the stator coordinates) and $\omega_m$ is a rotor angular speed or frequency (e.g., the angular speed of the rotor coordinates relative to the stator coordinates). The stator current vector $i_s$ and the electromagnetic torque $\tau_m$, respectively, may be defined using nonlinear functions of the state variables ($\psi_s$ & $\delta$):

$$i_s = L_s^{-1}(\delta)[\psi_s - \psi_f(\delta)], \quad (8)$$

$$\tau_m = i_s^T J \psi_s, \quad (9)$$

As special cases, the synchronous motor mathematical model described with (4)-(9) represents a surface-mounted PM motor if $L_d=L_q$ and a synchronous reluctance motor if $\psi_f=0$ (i.e., $\psi_f=[0\ 0]^T$).

The state observer 204 may be specifically a state observer having the stator flux linkage vector $\psi_s$ and the control-rotor rotation angle $\delta$ as state variables. The state observer 204 may be a back-electromotive-force-based state observer. The state observer 204 may specifically be configured to employ an observer gain matrix $K_0$ defined for the the stator flux linkage vector $\psi_s$ and an observer gain vector $k_0$ defined for the control-rotor rotation angle $\delta$ with forms of $K_0$ and $k_0$ selected so as to enable speed-sensorless estimation of the stator flux linkage vector using the state observer 204. In other words, the observer gain matrix $K_0$ and the observer gain vector $k_0$ may have forms selected for enabling decoupling of stator flux linkage estimation (error) dynamics from control-rotor rotation angle estimation (error) dynamics (i.e., from mechanical dynamics) which, in turn, enables the speed-sensorless estimation. The observer gain matrix $K_0$ and the observer gain vector $k_0$ may have a form selected so as to allow for stable magnetization and starting from zero angular speed. Both the observer gain matrix $K_0$ and the observer gain vector $k_0$ may be defined in terms of the same correction vector e describing the estimation error of the stator flux linkage vector $\psi_s$. In other words, both the observer gain matrix $K_0$ and the observer gain vector $k_0$ may be applied, in the state observer 204, separately to the same correction vector e for estimating the stator flux linkage vector and the control-rotor rotation angle, respectively.

In some alternative embodiments, the state variables of the state observer 204 may not comprise the stator flux linkage vector $\psi_s$ and/or the control-rotor rotation angle $\delta$. In general, the state variables of the state observer 204 may comprise (or consist of) one or more parameters whose values are dependent on the stator current vector $i_s$, the stator flux linkage vector $\psi_s$, the control-rotor rotation angle $\delta$.

Based on the mathematical model for the synchronous motor defined in (4)-(9), the state observer 204 may be formulated as $$\frac{d\hat{\psi}_s}{dt} = u_{s,ref} - R_s i_s - \omega_s J \hat{\psi}_s + K_0 e, \quad (10)$$

$$\frac{d\hat{\delta}}{dt} = k_o^T e, \quad (11)$$

wherein $\hat{\psi}_s$ is the estimated stator flux linkage vector and $\hat{\delta}$ is the estimated control-rotor rotation angle and e is a correction vector having the form $$e = L_s(\hat{\delta})i_s + \psi_f(\hat{\delta}) - \hat{\psi}_s. \quad (12)$$

Moreover, the observer gain matrix $K_0$ (for the estimated stator flux linkage vector $\hat{\psi}_s$) may defined as $$K_0 = 2\sigma_o \frac{\hat{\psi}_a \hat{\psi}_a^T}{\|\hat{\psi}_a\|^2} \quad (13)$$

where $\sigma_o$ is a pre-defined decay rate of a stator flux linkage estimation error (selectable by a user) and $\hat{\psi}_a$ is an (estimated) auxiliary flux linkage which may be defined as $$\hat{\psi}_a = \psi_f(\hat{\delta}) + [L_s(\hat{\delta}) + JL_s(\hat{\delta})J]i_s. \quad (14)$$

Here, the stator inductance matrix $L_s(\hat{\delta})$ and the PM flux linkage vector $\psi_f(\hat{\delta})$ may be defined as described above in connection with (4) and (5) (though with $\delta$ replaced with $\hat{\delta}$).

Finally, the observer gain vector $k_0$ (for the estimated control-rotor rotation angle $\hat{\delta}$) may be defined according to $$k_0^T = -\alpha_0 \frac{\hat{\psi}_a^T J}{\|\hat{\psi}_a\|^2}. \quad (15)$$

where $\alpha_0$ is a (pre-defined) control-rotor rotation angle estimation bandwidth (selectable by the user).

As was mentioned above, $L_d = L_q$ applies for a surface-mounted PM motor while $\psi_f = 0$ (i.e., $\psi_f = [0\ 0]^T$) applies for a synchronous reluctance motor. Thus, equations (10)-(15) are simplified accordingly in these special cases.

It may be shown that the form of the auxiliary flux $\hat{\psi}_a$ given in (14) is equivalent with a partial derivative of the correction vector e with respect to the control-rotor rotation angle $\hat{\delta}$ rotated by 90°, i.e., the auxiliary flux linkage vector $\hat{\psi}_a$ may be alternatively written as $$\hat{\psi}_a = J\left(\frac{\partial e}{\partial \hat{\delta}}\right). \quad (16)$$

The projections along the auxiliary flux linkage vector allow decoupling the estimation error dynamics of the stator flux linkage and the control-rotor rotation angle.

The estimated torque $\hat{\tau}_m$ may be calculated by the state observer 204 following the synchronous motor model equation (9), that is, it may be calculated as $$\hat{\tau}_m = i_s^T J \hat{\psi}_s. \quad (17)$$

In some embodiments, the state observer 204 as defined above may be extended with the PM flux estimation.

In some embodiments, the decay rate $\sigma_0$ for defining the observer gain matrix in (13) may be scheduled as $$\sigma_0 = \zeta_\infty |\omega_s| + \frac{R_s}{4}\left(\frac{1}{L_d} + \frac{1}{L_q}\right) \quad (18)$$

where $\zeta_\infty$ is a desired damping ratio at high speeds (i.e., at speeds above a certain limit). A high speed (that is, a high rotor angular speed leading to a high $\omega_s$) may correspond in this context to a speed at which $$\zeta_\infty |\omega_s| \gg \frac{R_s}{4}\left(\frac{1}{L_d} + \frac{1}{L_q}\right).$$

For example, the speed-dependent term $\zeta_\infty |\omega_s|$ may be at least larger than the term $$\frac{R_s}{4}\left(\frac{1}{L_d} + \frac{1}{L_q}\right)$$

multiplied by 10, 100 or 1000. With the selection of the decay rate $\sigma_0$ according to (18), at zero stator angular frequency $\omega_s = 0$, the poles are located at s=0 and $s = -R_s(L_d + L_q)/(2L_d L_q)$, which allows magnetizing and starting of the synchronous motor in a stable manner. If both poles were to be placed at s=0, the system would be unstable in the starting condition, which is a typical problem in conventional V/Hz control as well as in sensorless control if the observer gain is poorly designed. At high speeds, the choice in (18) results in poles located at $s=-(\zeta_\infty \pm j\sqrt{1-\zeta_\infty^2})|\omega_s|$. Studying the pole locations and the resulting observer equations reveals that the choice in (18) makes the observer dynamics to vary from the current-model-type dynamics (to the extent possible without a motion sensor) to well-damped voltage-model-type dynamics as the frequency increases starting from zero.

In some alternative embodiments, the state observer 204 may be specifically a state observer having the stator flux linkage vector $\psi_s$ but not the control-rotor rotation angle $\delta$ as a state variable. The state observer 204 may, in such cases, be fully independent of the control-rotor rotation angle $\delta$. The control-rotor rotation angle $\delta$ and its estimation serve to provide stability for the estimation of the stator flux linkage vector at low speeds in the case of control of a salient-pole synchronous motor. However, if the synchronous motor does not have to be operated at low speeds (or if reduced stability may be tolerated), the control-rotor rotation angle estimation is not necessary. Omitting the control-rotor rotation angle estimation may be especially feasible with non-salient pole synchronous motors (e.g., surface-mounted PM synchronous motors).

In the case of a $\delta$-independent state (or flux) observer as described in the previous paragraph, the state observer 204 may be formulated based on (10) & (12) as $$\frac{d\hat{\psi}_s}{dt} = u_{s,ref} - R_s i_s - \omega_s J \hat{\psi}_s + 2\sigma_o \frac{\hat{\psi}_f}{\|\hat{\psi}_f\|^2}(\psi_f - \|\hat{\psi}_f\|) \quad (19)$$

$$\hat{\psi}_f = \hat{\psi}_s - L_d i_s \quad (20)$$

where $L_d = L_q$ is assumed to apply and $\hat{\psi}_f$ is an auxiliary variable, originating from (8) and being independent of the PM-flux constant $\psi_f$. Notice that $\hat{\psi}_f$ would depend on $\hat{\delta}$ if $L_d \neq L_q$ applies. The other variables are defined as described above.

In some embodiments relating to either of the state observers discussed above, the voltage signal $u_{s,ref}$ as used by the state observer 204 may be corrected with an inverter model in order to compensate for a so-called dead-time effect and power device voltage drop.

Moving on to the implementation of the state feedback control element 203, the state feedback control element 203 may be configured to calculate the stator voltage reference vector $u_{s,ref}$ based on the detected stator current vector $i_s$, the stator angular frequency $\omega_s$, the stator flux linkage reference vector $\psi_{s,ref}$ and the stator flux linkage vector $\psi_s$ estimated by the flux observer 204. The stator flux linkage reference vector $\psi_{s,ref}$ may be defined as $\psi_{s,ref}=[\psi_{s,ref}\ 0]^T$, where $\psi_{s,ref}$ is a stator flux linkage reference. Specifically, the state feedback control element 203 may be configured to calculate the stator voltage reference vector $u_{s,ref}$ as $$u_{s,ref}=R_s i_s+\omega_s J \psi_{s,ref} K_c(\psi_{s,ref}-\hat{\psi}_s), \quad (21)$$

where $K_c$ is a pre-defined 2×2 state-feedback gain matrix. The control law of (21) is a special case of state-feedback control. Since no angular rotor speed (or its estimate) appears in the control law of (21), it is inherently speed-sensorless.

The state-feedback gain matrix $K_c$ may be defined, for example, to have a form $K_c=\sigma_c I+(\omega_d-\omega_{s0})J$, where $\sigma_c$ is an exponential decay rate, $\psi_d$ is a damped natural frequency and $\omega_{s0}$ is stator angular frequency at a certain operating point. In some embodiments, either $\omega_d$ or $(\omega_d-\omega_{s0})$ may be assumed (or defined) to be zero so that the state-feedback gain matrix $K_c$ has the form $K_c=\sigma_c I+\omega_{s0}J$ or $K_c=\sigma_c I$, respectively.

As was indicated above and as shown in FIG. 2, the value of the estimated torque $\hat{\tau}_m$ may, at least in some embodiments, be calculated by the state observer 204 (e.g., using (17)) and applied to elements 205, 206 in order to apply damping. Specifically, the internal stator frequency reference $\omega_s$ may be selected or formed, using the high-pass filter 206 and the subtraction element 205, as $$\omega_s=\omega_{m,ref}-k_\omega(\hat{\tau}_m-\hat{\tau}_{mf}), \quad (22)$$

where $\omega_{m,ref}$ is an external (rate-limited) rotor angular frequency or speed reference, $k_\omega$ is a positive gain for increasing the damping and $\hat{\tau}_{mf}$ is a low-pass filtered estimated torque (and thus, the term $\hat{\tau}_m-\hat{\tau}_{mf}$ corresponds to a high-pass filtered estimated torque). The low-pass filtered estimated torque $\hat{\tau}_{mf}$ may be defined according to $$\frac{d\hat{\tau}_{mf}}{dt} = \alpha_f(\hat{\tau}_m - \hat{\tau}_{mf}) \quad (23)$$

where $\alpha_f$ is a bandwidth of a first low-pass filter (i.e., a low-pass filter for filtering the estimated torque). Equivalently, the internal stator frequency reference $\omega_s$ may be expressed (in Laplace domain) as $$\omega_s=\omega_{m,ref}-F(s)\hat{\tau}_m, \quad (24)$$

where the response F(s) of the high-pass filter 206 may be defined as $$F(s) = \frac{k_\omega s}{s+\alpha_f}$$

and s is the complex frequency variable of Laplace domain (being equal to d/dt).

Figure 3:
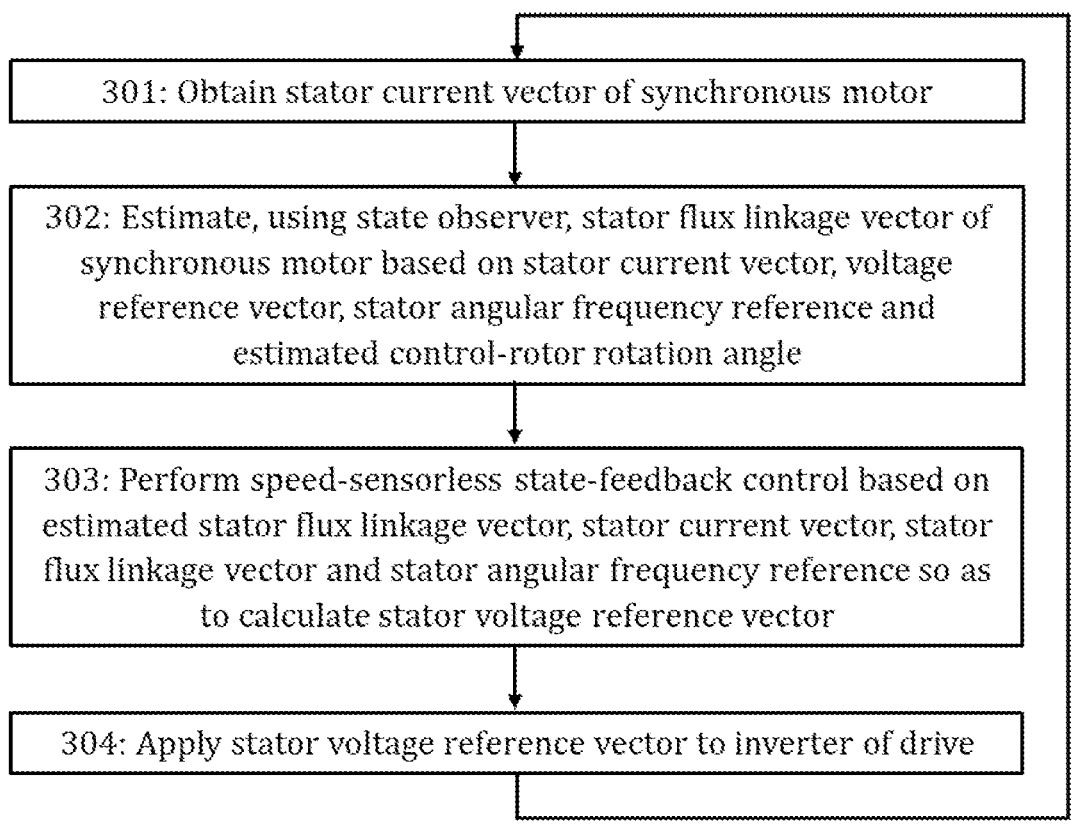
FIG. 3 illustrates an exemplary process according to embodiments.

FIG. 3 illustrates a process according to embodiments for performing observer-based V/Hz control of a synchronous motor. The process may be carried out by a drive or specifically by a computing device comprised in the drive. For example, the process may be carried out by the drive 101 of FIG. 1 or specifically by the computing device 104 of FIG. 1 comprised in the drive 101. Specifically, at least one processor of the computing device of the drive and at least one memory of the computing device of the drive for storing instructions to be executed by the at least one processor may be configured so as to cause the drive to carry out the illustrated process. In the following discussion, the actor of the process is called "the apparatus" for simplicity.

FIG. 3 provides a generic embodiment. Any of the specific features discussed above in connection with FIGS. 1 and 2 may be combined with the process of FIG. 3.

Referring to FIG. 3, the apparatus obtains, in block 301, a stator current vector of the synchronous motor (or specifically a measurement of the stator current vector of the synchronous motor). The obtaining of the stator current vector in block 301 may comprise receiving a stator current vector in stator coordinates as measured by a current detector of the drive from an output of an inverter of the drive and converting the measured stator current vector from stator coordinates to control coordinates used by the apparatus.

The apparatus estimates, in block 302, using a state observer, a stator flux linkage vector of the synchronous motor based on the stator current vector, a (pre-defined)

voltage reference vector, a (pre-defined) stator angular frequency reference and a control-rotor rotation angle estimated by the state observer. Here, the state observer is assumed to have, as state variables, the stator flux linkage vector and the control-rotor rotation angle (i.e., the angle between control coordinates and rotor coordinates). Further, the state observer is assumed to be a speed-sensorless back-electromotive-force-based state observer defined in the control coordinates and based on a mathematical model for the synchronous motor. An observer gain matrix $K_0$ defined for the stator flux linkage vector in the state observer and an observer gain vector $k_0$ defined for the control-rotor rotation angle in the state observer may have forms selected so that decoupling of stator flux linkage estimation error dynamics from control-rotor rotation angle estimation error dynamics is enabled such as forms defined in (13) and (15).

In some alternative embodiments, the estimating of the stator flux linkage vector of the synchronous motor using the state observer in block 302 may be based on the stator current vector, the voltage reference vector and the stator angular frequency reference but not on the control-rotor rotation angle. No control-rotor rotation angle may be estimated by the state observer in such embodiments (e.g., it may be, instead, assumed to be zero). Omitting the control-rotor rotation angle estimation may be especially feasible with non-salient pole synchronous motors (e.g., surface-mounted PM synchronous motors), as described above.

In some embodiments, the apparatus may estimate, in block 302, using the state observer, a torque of the synchronous motor based on the stator current vector and the estimated stator flux linkage vector. The torque may be estimated, e.g., according to (17).

The apparatus performs, in block 303, speed-sensorless state-feed-back control based on the estimated stator flux linkage vector, the stator current vector, a (pre-defined) stator flux linkage reference vector and the stator angular frequency reference so as to derive the stator voltage reference vector. The speed-sensorless state-feedback control may be performed using control coordinates. In some embodiments, the apparatus may apply, in block 303, the control law of (21) for deriving the stator voltage reference vector.

The apparatus applies, in block 304, the stator voltage reference vector to an inverter of the drive feeding the synchronous motor. The applying of the stator voltage reference vector to the inverter in block 304 may comprise converting the stator voltage reference vector from rotor coordinates to stator coordinates and applying the stator voltage reference vector in the stator coordinates to the inverter.

In some embodiments, the apparatus may be configured to adjust a value of an external rotor angular speed reference based on high-pass-filtered estimated torque so as to derive the stator angular speed reference (corresponding, in this case, effectively to a damped version of the external rotor angular speed reference). Namely, the apparatus may estimate, using the state observer, a torque of the synchronous motor based on the stator current vector, the stator voltage reference vector and the stator angular frequency (as described above), high-pass filter the estimated torque and calculate the stator angular frequency reference by adjusting a value of an external rotor angular speed reference based on the high-pass-filtered estimated torque (e.g., by subtracting the high-pass-filtered estimated torque from the external rotor angular speed as is done in FIG. 2). The torque (and the estimated torque), as discussed here and in connection with other embodiments, may correspond a normalized torque (i.e., torque normalized to a pre-defined value) or a non-normalized torque.

Figure 4:
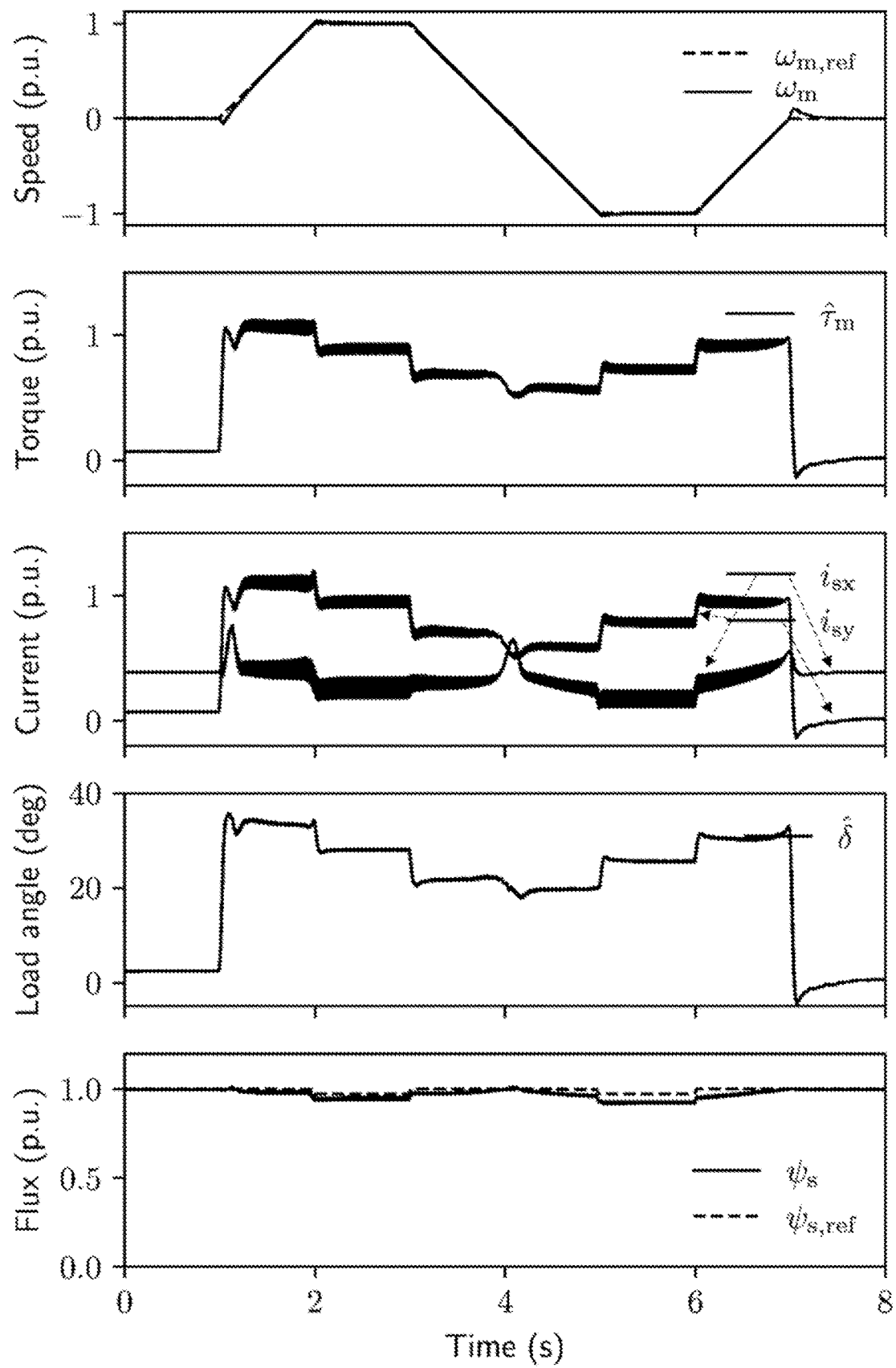
FIGS. 4 and 5 illustrate experimental results for the observer-based V/Hz control according to embodiments when applied to a permanent-magnet motor and a synchronous reluctance motor, respectively.
Figure 5:
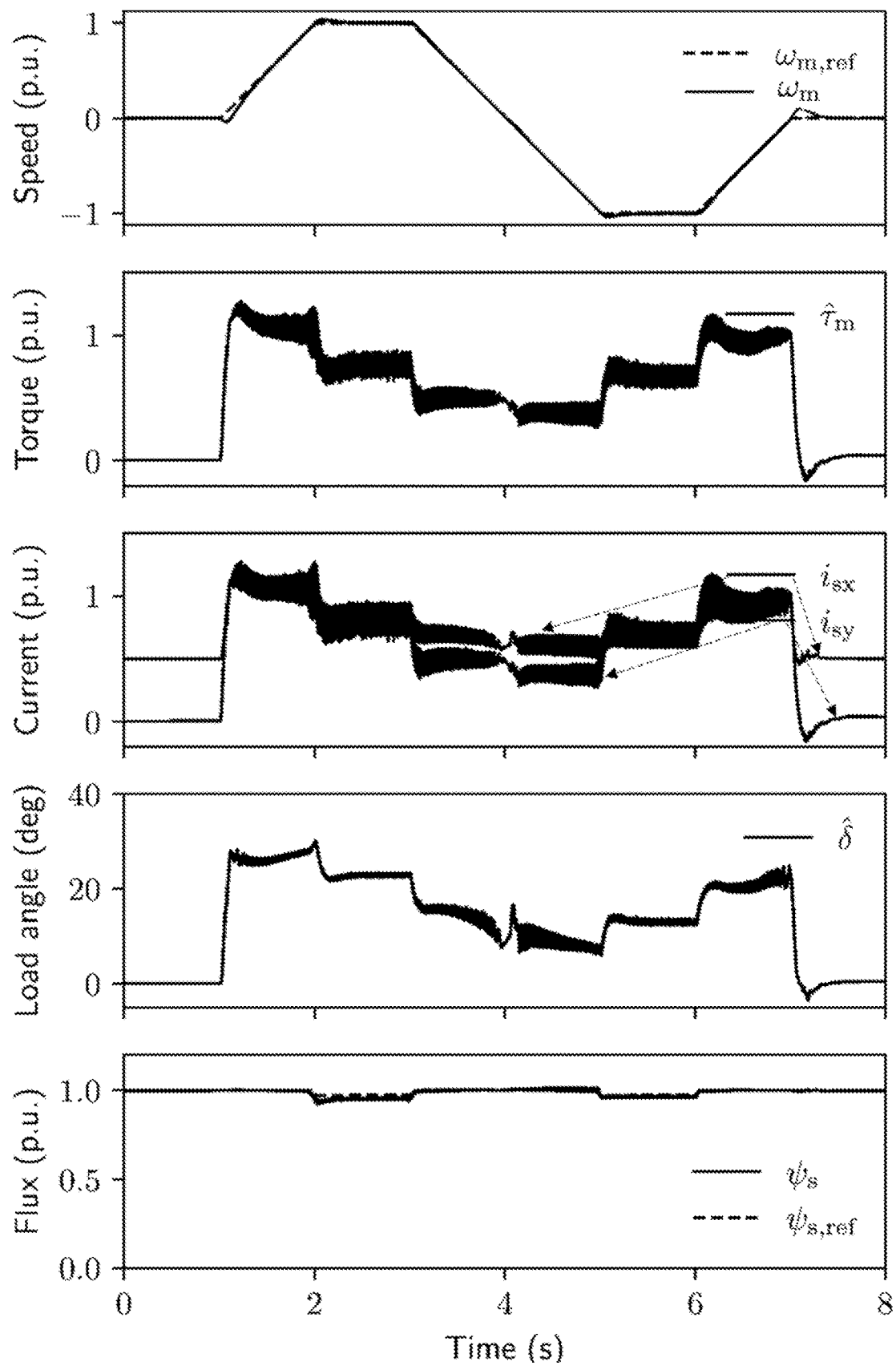

FIGS. 4 and 5 illustrates experimental results of the observer-based V/Hz control method according to embodiments when applied, respectively, to a 2.2-kW six-pole interior PM motor and a 6.7-kW four-pole SyRM. Specifically, each of FIGS. 4 and 5 shows experimental results for the rotor angular speed reference $\omega_{m,ref}$ and the angular frequency $\omega_m$ in the top subfigure, the stator voltage $u_s$ and DC-link voltage $u_{DC}/\sqrt{3}$ in the second-from-the-top subfigure, x- and y-axis stator currents $i_{sx}$ & $i_{sy}$ in the third-from-the-top subfigure, the estimated control-rotor rotation angle $\hat{\delta}$ in the fourth-from-the-top subfigure and the estimated stator flux linkage $\hat{\psi}_s$ in the bottom subfigure (all values being given in p.u.).

The following rated values are defined for the 2.2-kW six-pole synchronous motor:
 Voltage (line-to-neutral, peak value): $\sqrt{2/3}\cdot 370$ V, 1 p.u.
 Current (peak value): $\sqrt{2}\cdot 4.3$ A, 1 p.u.
 Frequency: 75 Hz, 1 p.u.
 Speed: 1500 r/min, 1 p.u.
 Torque: 14 Nm, 0.80 p.u.

Moreover, the following parameters are defined for the 2.2-kW six-pole synchronous motor:
 Stator resistance $R_s$: 3.6Ω, 0.07 p.u.
 d-axis inductance $L_d$: 36 mH, 0.36 p.u.
 q-axis inductance $L_q$: 51 mH, 0.48 p.u.
 PM flux linkage $\psi_f$: 0.55 Vs, 0.85 p.u
 Total inertia $J_M$: 0.015 kgm², 63.3 p.u.

The following rated values are defined for the 6.7-kW four-pole SyRM:
 Voltage (line-to-neutral, peak value): $\sqrt{2/3}\cdot 370$ V, 1 p.u.
 Current (peak value): $\sqrt{2}\cdot 15.5$ A, 1 p.u.
 Frequency: 105.8 Hz, 1 p.u.
 Speed: 3175 r/min, 1 p.u.
 Torque: 20.1 Nm, 0.67 p.u.

Moreover, the following parameters are defined for the 6.7-kW four-pole SyRM:
 Stator resistance $R_s$: 0.55 Ω, 0.04 p.u.
 d-axis inductance $L_d$: 46 mH, 2.20 p.u.
 q-axis inductance $L_q$: 6.8 mH, 0.33 p.u.
 Total inertia $J_M$: 0.015 kgm², 110.9 p.u.

The experiments were conducted on the proposed control method using a dSPACE MicroLabBox prototyping unit. The rotor speed was measured for monitoring purposes using a resolver. The switching frequency is 4 kHz. Inverter nonlinearities are compensated for using a current feed-forward method. Constant inductance estimates are used. For the 6.7-kW SyRM, the observer damping ratio parameter was decreased to $\zeta_\infty=0.2$ to reduce the effect of the unmodeled magnetic nonlinearities.

The state-feedback control law is parameterized using the constant gain matrix $K_c=\sigma_c I$ with $\sigma_c=2\pi\cdot 50$ rad/s. The bandwidth of the high-pass filter F(s) is $\alpha_f=2\pi\cdot 1$ rad/s, and the damping gain is $k_\omega=3$ (Nm·s)$^{-1}$. For the state observer, the design parameters $\zeta_\infty=0.7$ for the interior PM motor and $\zeta_\infty=0.2$ for the SyRM and $\alpha_\infty=2\pi\cdot 20$ rad/s for both motors are used. The constant flux reference $\psi_{s,ref}=1$ p.u. is used. The same design parameters (apart from $\zeta_\infty$) are used for both motors. The state observer relies on the realizable voltage reference, which is directly available from the standard space-vector PWM algorithm.

The control sequence illustrated in FIG. 4 is as follows. First, the frequency reference is ramped from zero to the rated frequency, then reversed, and finally ramped back to zero. The load torque increases stepwise from zero to its rated value (0.66 p.u.) in the beginning of the acceleration. When the frequency reference finally reaches zero at the end of the sequence, the load torque decreases stepwise to zero. It is to be noted that the chosen sequence is particularly difficult for speed sensorless control methods due to the stepwise change of load torque at zero speed and slow speed reversal while loaded.

FIG. 4 shows experimental results for the 2.2-kW PM motor in acceleration and deceleration at the rated load torque. In this sequence, the frequency reference is first ramped from zero to its rated value, then reversed before being finally ramped back to zero. The rated load torque is applied from the beginning of the acceleration until the end of the sequence when the frequency reference reaches zero again. This kind of a sequence is typically problematic for state-of-the-art sensorless control methods due to the load torque step at zero speed and the slow speed reversal while loaded. As expected, the system is stable and well damped.

FIG. 5 shows experimental results for the 6.7-kW SyRM in the same sequence as used for FIG. 4. It can be seen that the response of the SyRM is very similar to that of the PM motor. Furthermore, magnetization is handled in a stable manner, and the stator-flux dynamics are governed by the decay rate $\sigma_c$.

The embodiments of the proposed observer-based V/Hz control provide at least some of the following technical advantages (depending on the particular embodiments):

No speed detector or controller needs to be implemented in the drive which simplifies the architecture of the drive as well as simplifying the tuning of the control system.

Magnetization and field weakening are inherent to the observer-based V/Hz control without needing a separate algorithm.

Full utilization of the inverter voltage is enabled since no voltage margin is needed (that is, the control method automatically manages field weakening when the maximum inverter voltage is reached).

The observer-based V/Hz control method is completely stable and passive, and, consequently, robust against unknown mechanics.

As compared to heuristic V/Hz control structures, a trial-and-error process in tuning can be reduced since all the design parameters have a clear physical meaning.

The blocks, related functions, and information exchanges described above by means of FIGS. 2 and 3 are in no absolute chronological order, and some of them may be performed simultaneously or in an order differing from the given one. Other functions can also be executed between them or within them. Some of the blocks or part of the blocks or one or more pieces of information can also be left out or replaced by a corresponding block or part of the block or one or more pieces of information.

In an embodiment, at least some of the processes described in connection with FIGS. 2 to 5 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form (processing) means or comprises one or more computer program code portions for carrying out one or more operations according to any one of the embodiments of FIGS. 2 to 5 or operations thereof.

Embodiments as described may also be carried out in the form of a computer process defined by a computer program or portions thereof. Embodiments of the methods described in connection with FIGS. 2 to 5 may be carried out by executing at least one portion of a computer program comprising corresponding instructions. The computer program may be provided as a computer readable medium comprising program instructions stored thereon or as a non-transitory computer readable medium comprising program instructions stored thereon. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

While many of the features of the embodiments were discussed above using specific matrix and vector-based equations (1)-(24), it should be noted that many of said equations may be written in multiple equivalent forms. The embodiments are not limited to the particular forms used in (1)-(24) but also encompass any mathematically equivalent forms of the same equations.

Even though the embodiments have been described above with reference to examples according to the accompanying drawings, it is clear that the embodiments are not restricted thereto but can be modified in several ways within the scope of the appended claims. Therefore, all words and expressions should be interpreted broadly, and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. An apparatus for a drive for driving a synchronous motor, the apparatus being configured to implement an observer-based V/Hz control of the synchronous motor and comprising:
   a stator current vector of the synchronous motor;
   a state observer estimating a stator flux linkage vector of the synchronous motor based on the stator current vector, a stator voltage reference vector and a stator angular frequency reference and optionally a control-rotor rotation angle estimated by the state observer, wherein the control-rotor rotation angle is an angle between control coordinates and rotor coordinates and the state observer is a speed-sensorless back-electromotive-force-based state observer defined in the control coordinates and being based on a mathematical model for the synchronous motor;
   speed-sensorless state-feedback control based on the estimated stator flux linkage vector, the stator current vector, a stator flux linkage reference vector and the stator angular frequency reference so as to calculate the stator voltage reference vector; and an application of the stator voltage reference vector to an inverter of the drive feeding the synchronous motor.

2. The apparatus of claim 1, wherein the speed-sensorless state-feedback control operates using the control coordinates, wherein the stator current vector is obtained by receiving a stator current vector defined in stator coordinates and measured by a current detector from an output of the inverter and converting the measured stator current vector from the stator coordinates to the control coordinates, and the application of the stator voltage reference vector includes converting the stator voltage reference vector from the control coordinates to the stator coordinates and applying the stator voltage reference vector in the stator coordinates to the inverter.

3. The apparatus of claim 1, wherein means are configured to perform the estimating of the stator flux linkage vector based on the control-rotor rotation angle, state variables of the state observer comprise the stator flux linkage vector and the control-rotor rotation angle and an observer gain matrix $K_0$ defined for the stator flux linkage vector in the state observer and an observer gain vector $k_0$ defined for the control-rotor rotation angle in the state observer have forms selected so that decoupling of stator flux linkage estimation error dynamics from control-rotor rotation angle estimation error dynamics is enabled.

4. The apparatus of claim 3, wherein the state observer is configured to follow state equations $$\frac{d\hat{\psi}_s}{dt} = u_{s,ref} - R_s i_s - \omega_s J \hat{\psi}_s + K_0 e,$$

$$\frac{d\hat{\delta}}{dt} = k_o^T e$$

wherein $\hat{\psi}_s$ is the estimated stator flux linkage vector, $\hat{\delta}$ is the estimated control-rotor rotation angle, $u_{s,ref}$ is the stator voltage reference vector, $R_s$ is a stator resistance of the synchronous motor, $i_s$ is the stator current vector, $\omega_s$ is the stator angular frequency reference, $J$ is an orthogonal rotation matrix and e is a correction vector having the form $$e = L_s(\hat{\delta}) i_s + \psi_f(\hat{\delta}) - \hat{\psi}_s$$

wherein $L_s$ is a stator inductance matrix of the synchronous motor and $\psi_f$ is a permanent magnet flux linkage vector of the synchronous motor.

5. The apparatus of claim 4, wherein the observer gain matrix $K_0$ is defined as $$K_0 = 2\sigma_o \frac{\hat{\psi}_a \hat{\psi}_a^T}{\|\hat{\psi}_a\|^2}$$

wherein $\sigma_o$ is a pre-defined decay rate of a stator flux linkage estimation error and $\hat{\psi}_a$ is an auxiliary flux linkage defined as $$\hat{\psi}_a = \psi_f(\hat{\delta}) + [L_s(\hat{\delta}) + JL_s(\hat{\delta})J] i_s.$$

6. The apparatus of claim 5, wherein the observer gain vector $k_0$ is defined according to $$k_0^T = -\alpha_0 \frac{\hat{\psi}_a^T J}{\|\hat{\psi}_a\|^2}$$

wherein $\alpha_0$ is a pre-defined control-rotor rotation angle estimation bandwidth.

7. The apparatus of claim 4, wherein the stator inductance matrix $L_s(\hat{\delta})$ and the permanent magnet flux linkage vector $\psi_f(\hat{\delta})$ are defined according to $$L_s(\hat{\delta}) = e^{-\hat{\delta}J} \begin{bmatrix} L_d & 0 \\ 0 & L_q \end{bmatrix} e^{\hat{\delta}J}$$

$$\psi_f(\hat{\delta}) = e^{-\hat{\delta}J} \begin{bmatrix} \psi_f \\ 0 \end{bmatrix}$$

wherein $L_d$ and $L_q$ are direct and quadrature axis inductances of the synchronous motor and $\psi_f$ is a permanent magnet flux linkage.

8. The apparatus of claim 7, wherein the synchronous motor is a surface-mounted permanent magnet motor and consequently $L_d = L_q$ applies or the synchronous motor is a synchronous reluctance motor and consequently $\psi_f = 0$ applies.

9. The apparatus of claim 1, wherein means are further configured to perform:

estimating, using the state observer, a torque of the synchronous motor based on the stator current vector and the estimated stator flux linkage vector;

high-pass filtering the estimated torque; and calculating the stator angular frequency reference by adjusting a value of an external rotor angular speed reference based on the high-pass-filtered estimated torque.

10. The apparatus of claim 9, wherein means are configured to calculate the stator angular frequency reference @s according to $$\omega_s = \omega_{m,ref} - F(s)\hat{\tau}_m$$

wherein $\omega_{m,ref}$ is an external (rate-limited) rotor angular speed reference, $$F(s) = \frac{k_\omega s}{s + \alpha_f}$$

is a response of a high-pass filter in Laplace domain and $\hat{\tau}_m$ is the estimated torque, $k_\omega$ being a positive gain term for increasing damping and $\alpha_f$ being a bandwidth of the high-pass filter.

11. The apparatus of claim 1, wherein means are further configured to perform:

estimating, using the state observer, a torque of the synchronous motor $\hat{\tau}_m$ according to $$\hat{\tau}_m = i_s^T \hat{\psi}_s$$

wherein $i_s$ is the stator current vector, $J$ is an orthogonal rotation matrix and $\hat{\psi}_s$ is the estimated stator flux linkage vector;

high-pass filtering the estimated torque; and calculating the stator angular frequency reference by adjusting a value of an external rotor angular speed reference based on the high-pass-filtered estimated torque.

12. The apparatus of claim 1, wherein means are configured to perform the speed-sensorless state-feedback control for calculating the stator voltage reference vector $u_{s,ref}$ according to $$u_{s,ref} = R_s i_s + \omega_s J \psi_{s,ref} + K_c(\psi_{s,ref} - \hat{\psi}_s)$$

wherein $R_s$ is a stator resistance of the synchronous motor, $i_s$ is the stator current vector, $\omega_s$ is the stator angular frequency reference, J is an orthogonal rotation matrix, $\psi_{s,ref}$ is the stator flux linkage reference vector, $\hat{\psi}s$ is the stator flux linkage vector estimated by the state observer and $K_c$ is a pre-defined 2×2 state-feedback gain matrix.

13. An electric drive configured to drive a synchronous motor, the electric drive comprising an inverter and a computing device including a processor, and a memory storing instructions for performing an observer-based V/Hz control of the synchronous motor, wherein the instructions, when executed by the processor, cause the computing device to:
   obtain a stator current vector of the synchronous motor;
   estimate, using a state observer, a stator flux linkage vector of the synchronous motor based on the stator current vector, a stator voltage reference vector and a stator angular frequency reference and optionally a control-rotor rotation angle estimated by the state observer, wherein the control-rotor rotation angle is an angle between control coordinates and rotor coordinates and the state observer is a speed-sensorless back-electromotive-force-based state observer defined in the control coordinates and being based on a mathematical model for the synchronous motor;
   perform speed-sensorless state-feedback control based on the estimated stator flux linkage vector, the stator current vector, a stator flux linkage reference vector and the stator angular frequency reference so as to calculate the stator voltage reference vector; and
   apply the stator voltage reference vector to the inverter for feeding the synchronous motor.

14. A method for an observer-based V/Hz control of a synchronous motor, the method comprising:
   obtaining a stator current vector of the synchronous motor;
   estimating, using a state observer, a stator flux linkage vector of the synchronous motor based on the stator current vector, a stator voltage reference vector and a stator angular frequency reference and optionally a control-rotor rotation angle estimated by the state observer, wherein the control-rotor rotation angle is an angle between control coordinates and rotor coordinates and the state observer is a speed-sensorless back-electromotive-force-based state observer defined in the control coordinates and being based on a mathematical model for the synchronous motor;
   performing speed-sensorless state-feedback control based on the estimated stator flux linkage vector, the stator current vector, a stator flux linkage reference vector and the stator angular frequency reference so as to calculate the stator voltage reference vector; and
   applying the stator voltage reference vector to an inverter of a drive feeding the synchronous motor.

15. A computer program product comprising program instructions embodied on a non-transitory computer readable medium for performing an observer-based V/Hz control of a synchronous motor, the performing comprising at least the following steps:
   obtaining a stator current vector of the synchronous motor;
   estimating, using a state observer, a stator flux linkage vector of the synchronous motor based on the stator current vector, a stator voltage reference vector and a stator angular frequency reference and optionally a control-rotor rotation angle estimated by the state observer, wherein the control-rotor rotation angle is an angle between control coordinates and rotor coordinates and the state observer is a speed-sensorless back-electromotive-force-based state observer defined in the control coordinates and being based on a mathematical model for the synchronous motor;
   performing speed-sensorless state-feedback control based on the estimated stator flux linkage vector, the stator current vector, a stator flux linkage reference vector and the stator angular frequency reference so as to calculate the stator voltage reference vector; and
   applying the stator voltage reference vector to an inverter of a drive feeding the synchronous motor.

\* \* \* \* \*